United States Patent
Suzuki et al.

(10) Patent No.: US 9,927,222 B2
(45) Date of Patent: Mar. 27, 2018

(54) POSITION/ORIENTATION MEASUREMENT APPARATUS, MEASUREMENT PROCESSING METHOD THEREOF, AND NON-TRANSITORY COMPUTER-READABLE STORAGE MEDIUM

(71) Applicant: CANON KABUSHIKI KAISHA, Tokyo (JP)

(72) Inventors: Masahiro Suzuki, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 14/847,229

(22) Filed: Sep. 8, 2015

(65) Prior Publication Data
US 2015/0377612 A1    Dec. 31, 2015

Related U.S. Application Data

(63) Continuation of application No. 13/809,509, filed as application No. PCT/JP2011/066642 on Jul. 14, 2011, now Pat. No. 9,163,940.

(30) Foreign Application Priority Data

Jul. 16, 2010    (JP) ................. 2010-162209

(51) Int. Cl.
G06K 9/00    (2006.01)
G01B 11/00    (2006.01)
(Continued)

(52) U.S. Cl.
CPC ............ G01B 11/002 (2013.01); G01B 11/14 (2013.01); G01C 11/04 (2013.01);
(Continued)

(58) Field of Classification Search
CPC ....... G01B 11/002; G01B 11/14; G01C 11/04; G06K 9/00208; G06T 2200/24;
(Continued)

(56) References Cited

U.S. PATENT DOCUMENTS

| | | | |
|---|---|---|---|
| 6,792,370 B2 | 9/2004 | Satoh et al. | |
| 6,993,450 B2 | 1/2006 | Takemoto et al. | |

(Continued)

FOREIGN PATENT DOCUMENTS

| | | |
|---|---|---|
| EP | 1462997 A | 9/2004 |
| JP | 2003-136465 A | 5/2003 |

(Continued)

OTHER PUBLICATIONS

R.Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4 (1987).

(Continued)

*Primary Examiner* — Nirav G Patel
(74) *Attorney, Agent, or Firm* — Fitzpatrick, Cella, Harper & Scinto

(57) ABSTRACT

A position/orientation measurement apparatus inputs the two-dimensional image of a measurement object captured by an image capturing apparatus, obtains the distance data of the measurement object measured by a distance sensor, detects an image feature of the measurement object from the two-dimensional image, determines the state of the measurement object, sets, based on the determined state, a usage mode regarding the image feature and the distance data when measuring the position/orientation, and measures the position/orientation of the measurement object in accordance with the set usage mode.

15 Claims, 12 Drawing Sheets

(51) Int. Cl.
*G01C 11/04* (2006.01)
*G01B 11/14* (2006.01)
*G06T 7/73* (2017.01)

(52) U.S. Cl.
CPC ............ *G06K 9/00208* (2013.01); *G06T 7/75* (2017.01); *G06T 2200/24* (2013.01); *G06T 2207/10028* (2013.01); *G06T 2207/20092* (2013.01)

(58) Field of Classification Search
CPC . G06T 2207/10028; G06T 2207/20092; G06T 7/75
See application file for complete search history.

(56) References Cited

U.S. PATENT DOCUMENTS

| | | | |
|---|---|---|---|
| 7,092,109 B2 | 8/2006 | Satoh et al. | |
| 7,130,754 B2 | 10/2006 | Satoh et al. | |
| 7,664,341 B2 | 2/2010 | Takemoto et al. | |
| 7,860,345 B2 | 12/2010 | Satoh et al. | |
| 8,223,146 B2 | 7/2012 | Kotake et al. | |
| 2004/0062435 A1 | 4/2004 | Yamaoka et al. | |
| 2004/0190766 A1 | 9/2004 | Watanabe et al. | |
| 2009/0237269 A1* | 9/2009 | Okugi .................. | B60R 1/00 340/901 |
| 2010/0142826 A1 | 6/2010 | Kotake et al. | |
| 2010/0208057 A1* | 8/2010 | Meier .................. | G06T 19/006 348/135 |
| 2010/0324737 A1* | 12/2010 | Handa .................. | G06K 9/626 700/259 |
| 2010/0328682 A1 | 12/2010 | Kotake et al. | |
| 2011/0001793 A1* | 1/2011 | Moriyama ............ | G01B 11/24 348/46 |
| 2012/0275654 A1 | 11/2012 | Fujiki et al. | |
| 2013/0076865 A1 | 3/2013 | Tateno et al. | |
| 2013/0114886 A1 | 5/2013 | Kotake et al. | |
| 2013/0121592 A1 | 5/2013 | Fujiki et al. | |
| 2013/0245828 A1 | 9/2013 | Tateno et al. | |

FOREIGN PATENT DOCUMENTS

| | | |
|---|---|---|
| JP | 2004-295223 A | 10/2004 |
| JP | 2010-060451 A | 3/2010 |
| JP | 2010060451 A * | 3/2010 |

OTHER PUBLICATIONS

L. Vacchetti et al., "Combining Edge and Texture Information for Real-Time Accurate 3D Camera Tracking," Proc. 3rd IEEE/ACM International Symposium on Mixed and Augmented Reality (ISMAR '04), pp. 48-57 (2004).

Oct. 11, 2011 International Search Report and Written Opinion in the international application PCT/JP2011/066642.

* cited by examiner

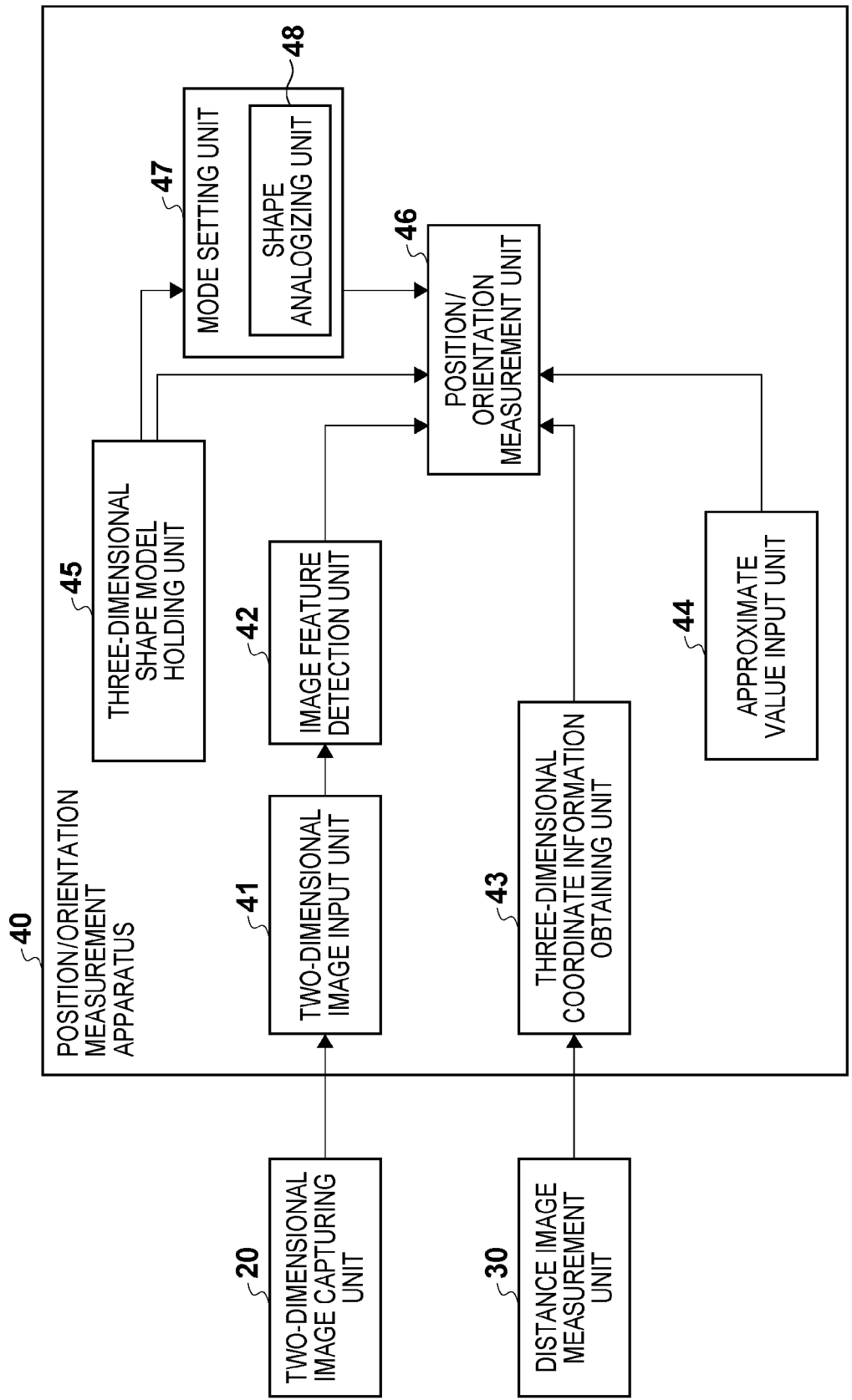

FIG. 2C

| POINT | X | Y | Z |
|---|---|---|---|
| P1 | 200 | 200 | 0 |
| P2 | 200 | 200 | 150 |
| P3 | 100 | 200 | 150 |
| P4 | 100 | 200 | 350 |
| P5 | 200 | 200 | 350 |
| P6 | 200 | 200 | 500 |
| P7 | 0 | 200 | 500 |
| P8 | 0 | 200 | 0 |
| P9 | 0 | 100 | 0 |
| P10 | 0 | 100 | 500 |
| P11 | 0 | 0 | 500 |
| P12 | 0 | 0 | 0 |
| P13 | 200 | 0 | 0 |
| P14 | 200 | 0 | 500 |

FIG. 2D

| LINE | 2 END POINTS |
|---|---|
| L1 | P1-P6 |
| L2 | P2-P3 |
| L3 | P3-P4 |
| L4 | P4-P5 |
| L5 | P6-P7 |
| L6 | P7-P11 |
| L7 | P11-P12 |
| L8 | P12-P13 |
| L9 | P1-P13 |
| L10 | P8-P12 |
| L11 | P9-P10 |
| L12 | P7-P8 |
| L13 | P1-P8 |
| L14 | P13-P14 |
| L15 | P6-P14 |
| L16 | P11-P14 |

POSITION/ORIENTATION MEASUREMENT APPARATUS, MEASUREMENT PROCESSING METHOD THEREOF, AND NON-TRANSITORY COMPUTER-READABLE STORAGE MEDIUM

This application is a continuation of pending application Ser. No. 13/809,509 filed Jan. 10, 2013, which has been allowed, which was the National Stage of International Patent Application No. PCT/JP2011/066642 filed Jul. 14, 2011.

TECHNICAL FIELD

The present invention relates to a position/orientation measurement apparatus, a measurement processing method thereof, and a non-transitory computer-readable storage medium.

BACKGROUND ART

Along with the recent advance of robot technologies, robots have taken the place of humans in doing complicated tasks (for example, assembling industrial products). Such a robot grips a component by an end effector such as a hand to assemble a product. For this assembly, it is necessary to measure the relative position/orientation between the component to be gripped and the robot (hand).

A method of measuring the position/orientation by performing model fitting for features detected from a two-dimensional image captured by an image capturing apparatus is known. Another known method converts various points of a distance image obtained by a distance sensor into three-dimensional point cloud data and performing model fitting for the three-dimensional point cloud.

In the model fitting for a two-dimensional image, a three-dimensional shape model is projected onto the two-dimensional image based on the position/orientation of an object, and the projected image is fitted to features detected from the two-dimensional image, thereby measuring the position/orientation of the object.

In the model fitting for a distance image, various points of the distance image expressing distance data are converted into three-dimensional point cloud data, and it is fitted to a three-dimensional shape model, thereby measuring the position/orientation of an object. Also known is a method of measuring the position/orientation of an object using both measurement information obtained from a two-dimensional image and that obtained from a distance image.

The arrangement that measures the position/orientation of an object using both measurement information obtained from a two-dimensional image and that obtained from a distance image is generally expected to improve the measurement accuracy.

However, the measurement can sometimes be done more accurately by using only one of the measurement information obtained from the two-dimensional image and that obtained from the distance image depending on the measurement situation (for example, the shape of the object or the manner the object is placed).

A sufficient measurement accuracy may be ensured only by performing measurement using one of the measurement information obtained from the two-dimensional image and that obtained from the distance image according to circumstances. In this case, it is unnecessary to perform the measurement using both methods. Considering the calculation time or calculation resource, the processing may be wasteful instead.

SUMMARY OF INVENTION

The present invention provides a technique of selectively executing one of a plurality of measurement methods concerning the position/orientation of a measurement object.

According to a first aspect of the present invention, there is provided a position/orientation measurement apparatus for measuring a position/orientation of a measurement object, characterized by comprising: input means for inputting a two-dimensional image of the measurement object captured by an image capturing apparatus; obtaining means for obtaining distance data of the measurement object measured by a distance sensor; detection means for detecting an image feature of the measurement object from the two-dimensional image; determination means for determining a state of the measurement object; mode setting means for setting, based on the state determined by the determination means, a usage mode regarding the image feature and the distance data when measuring the position/orientation; and measurement means for measuring the position/orientation of the measurement object in accordance with the usage mode set by the mode setting means.

According to a second aspect of the present invention, there is provided a measurement processing method of a position/orientation measurement apparatus for measuring a position/orientation of a measurement object, characterized by comprising the steps of: inputting a two-dimensional image of the measurement object captured by an image capturing apparatus; obtaining distance data of the measurement object measured by a distance sensor; detecting an image feature of the measurement object from the two-dimensional image; determining a state of the measurement object; setting, based on the determined state, a usage mode regarding the image feature and the distance data when measuring the position/orientation; and measuring the position/orientation of the measurement object in accordance with the set usage mode.

According to a third aspect of the present invention, there is provided a non-transitory computer-readable storage medium storing a computer program that causes a computer for measuring a position/orientation of a measurement object to function as: input means for inputting a two-dimensional image of the measurement object captured by an image capturing apparatus; obtaining means for obtaining distance data of the measurement object measured by a distance sensor; detection means for detecting an image feature of the measurement object from the two-dimensional image; determination means for determining a state of the measurement object; mode setting means for setting, based on the state determined by the determination means, a usage mode regarding the image feature and the distance data when measuring the position/orientation; and measurement means for measuring the position/orientation of the measurement object in accordance with the usage mode set by the mode setting means.

Further features of the present invention will be apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

FIG. 1 is a block diagram showing an example of the functional arrangement of a position/orientation measurement apparatus 40 according to an embodiment;

FIGS. 2A to 2D are views showing an example of a three-dimensional shape model;

DESCRIPTION OF EMBODIMENTS

Figure 2A:
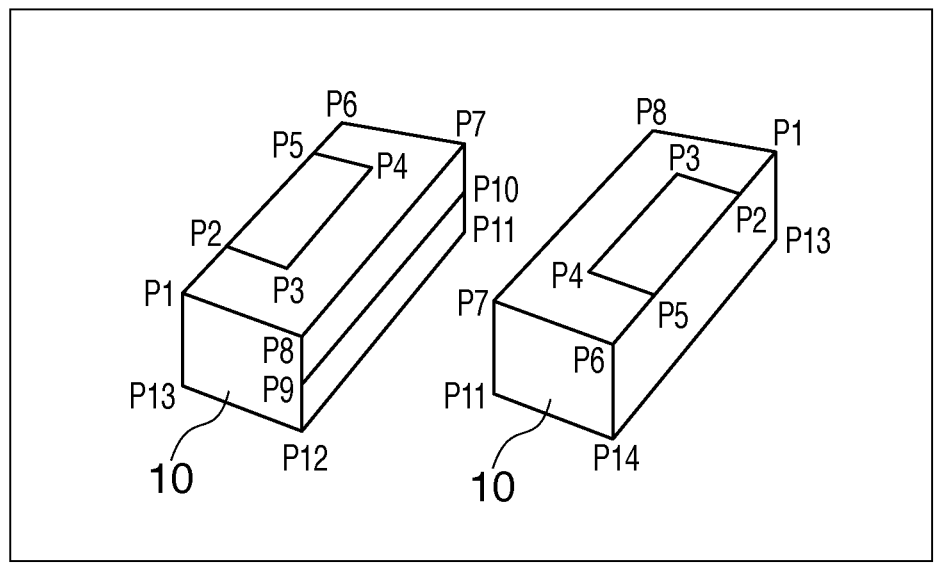

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

FIG. 1 is a block diagram showing an example of the functional arrangement of a position/orientation measurement apparatus 40 according to this embodiment.

The position/orientation measurement apparatus 40 selectively performs processing of measuring (calculating) the position/orientation of a measurement object (to be sometimes simply referred to as an object hereinafter) based on model data (three-dimensional shape model) that simulates the measurement object. One of a first mode (first measurement mode in this embodiment) and a second mode (second measurement mode in this embodiment) is set, and the position/orientation of the measurement object is measured in accordance with the mode. This will be explained later in detail. In the first measurement mode, model fitting is performed simultaneously using measurement information (image features) obtained from a two-dimensional image and that (three-dimensional point cloud data) obtained from a distance image. In the second measurement mode, model fitting is performed using only measurement information (image features) obtained from a two-dimensional image.

The position/orientation measurement apparatus 40 is connected to a two-dimensional image capturing unit 20 and a distance image measurement unit 30.

The two-dimensional image capturing unit 20 has a function of capturing a two-dimensional image and is implemented by, for example, an image capturing apparatus (for example, camera). The captured two-dimensional image can be either a grayscale image or a color image.

The distance image measurement unit 30 has a function of measuring a distance image representing the distance up to the surface of a measurement object and is implemented by, for example, a distance sensor. The distance sensor outputs a distance image. The distance image includes pixels each having depth information from the viewpoint position (the position of the distance sensor) and expresses distance data from the distance sensor to the object. The distance sensor adopts an active method which irradiates the object with a laser beam or a slit beam, causes the camera to capture the reflected light, and measures the distance by triangulation. Note that the distance sensor can employ any other method capable of capturing a distance image. For example, the distance sensor may employ a Time-of-flight method using the time of flight of light, or a passive method of calculating the depth of each pixel by triangulation based on an image captured by a stereo camera.

The position/orientation measurement apparatus 40 includes a three-dimensional shape model holding unit 45, an approximate value input unit 44, a two-dimensional image input unit 41, an image feature detection unit 42, a three-dimensional coordinate information obtaining unit 43, a mode setting unit 47, and a position/orientation measurement unit 46.

The two-dimensional image input unit 41 inputs an image captured by the two-dimensional image capturing unit 20 to the apparatus (position/orientation measurement apparatus 40). Internal parameters such as the focal length, the principal position, and the lens distortion parameter of the image capturing apparatus may be calibrated in advance (see R. Y. Tsai, "A versatile camera calibration technique for high-accuracy 3D machine vision metrology using off-the-shelf TV cameras and lenses", IEEE Journal of Robotics and Automation, vol. RA-3, no. 4, 1987).

The three-dimensional coordinate information obtaining unit 43 generates three-dimensional point cloud data (information representing the surface shape of the measurement object) based on the distance image measured by the distance image measurement unit 30 and inputs it to the apparatus. The three-dimensional coordinate information obtaining unit 43 converts the pixels of the distance image into three-dimensional point cloud data on the camera coordinate system (the coordinate system of the two-dimensional image capturing unit 20) and obtains it as three-dimensional coordinate information. Conversion to the three-dimensional point cloud data is done based on the relative position/orientation (known information) between the distance sensor (distance image measurement unit 30) and the camera (two-dimensional image capturing unit 20). More specifically, the conversion is performed by multiplying a line-of-sight vector corresponding to the position of each pixel of the distance image by a depth value. Note that calibration may be done in advance assuming that the distance sensor (distance image measurement unit 30) and the camera (two-dimensional image capturing unit 20) are fixed and therefore hold an invariable relative position/orientation. For example, a calibration object having a known three-dimensional shape is observed from various directions. The relative position/orientation is obtained based on the difference between the position/orientation of the calibration object based on the two-dimensional image and that based on the distance image. Note that two-dimensional image capturing by the two-dimensional image capturing unit 20 and distance image measurement by the distance image measurement unit 30 are preferably performed simultaneously. However, the image capturing and the measurement need not always be done simultaneously when the position/orientation relationship between the position/orientation measurement apparatus 40 and the measurement object does not change because of, for example, the measurement object at rest.

Figure 2B:
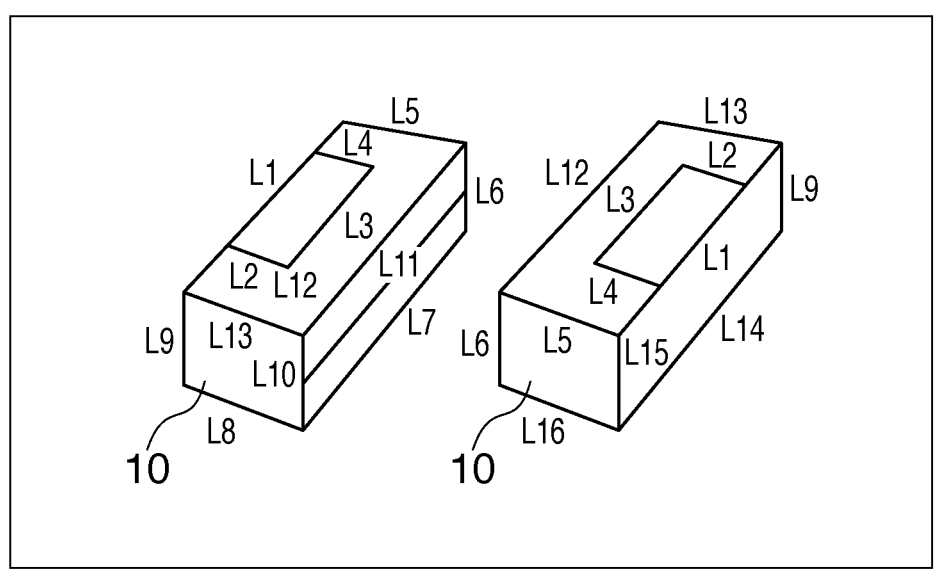

The three-dimensional shape model holding unit 45 holds information representing three-dimensional shape model data (three-dimensional shape model) that simulates the object (measurement object) as the position/orientation measurement target. An example of the three-dimensional shape model according to this embodiment will be described with reference to FIGS. 2A to 2D. The three-dimensional shape model is defined as a set of points and a set of line segments formed by connecting the points. As shown in FIG. 2A, a three-dimensional shape model 10 includes 14 points P1 to P14. The three-dimensional shape model 10 also includes line segments L1 to L16, as shown in FIG. 2B. The points P1 to P14 are represented by three-dimensional coordinate values, as shown in FIG. 2C. Each of the line segments L1 to L16 is represented by the IDs (identifiers) of points that form the line segment, as shown in FIG. 2D.

Note that the three-dimensional shape model also holds plane information, although not illustrated here. Each plane is represented by the IDs of points that form the plane. In the three-dimensional shape model shown in FIGS. 2A and 2B, pieces of information of six planes that form a rectangular parallelepiped are defined. The three-dimensional shape model is used when the position/orientation measurement unit 46 measures the position/orientation of the object, or the mode setting unit 47 sets a mode.

The approximate value input unit 44 inputs the approximate value of the position/orientation of the object with respect to the position/orientation measurement apparatus 40. In this embodiment, the position/orientation of the object with respect to the position/orientation measurement apparatus 40 indicates the position/orientation of the object based on the two-dimensional image capturing unit 20. However, they need not always be based on the two-dimensional image capturing unit 20. For example, if the position/orientation of the object relative to the coordinate system of the two-dimensional image capturing unit 20 is known and does not change, another portion of the position/orientation measurement apparatus 40 may be used as the basis. In this embodiment, a value the position/orientation measurement apparatus 40 has measured in the past (for example, immediately before) from the object is used as the approximate value of the position/orientation of the object. However, the approximate value of the position/orientation of the object needs not always be such a value. For example, time series filtering (for example, a linear filter or a Kalman filter) is performed for the value of the position/orientation of the object measured in the past to estimate the kinetic velocity or the angular velocity of the object. A predicted value of the position/orientation of the object based on the estimation result may be the approximate value. Alternatively, the position/orientation of the object obtained from a sensor may be the approximate value. The sensor need only measure the position/orientation of the object with 6 degrees of freedom, and any method (for example, a magnetic method, an optical method, or an ultrasonic method) is usable. Note that the coarse position/orientation in which the object is placed may be obtained by pattern matching or the like. If the coarse position/orientation in which the object is placed is known in advance, it may be used as the approximate value.

The image feature detection unit 42 detects image features representing the measurement object from the two-dimensional image input by the two-dimensional image input unit 41. In this embodiment, an example will be described in which edges (the extreme values of the density gradient) are detected as the image features.

The mode setting unit 47 switches the mode (usage mode) of measuring the position/orientation of the measurement object based on its shape (the shape of the three-dimensional shape model held by the three-dimensional shape model holding unit 45). The mode setting unit 47 includes a shape analogizing unit 48 configured to analogize the shape of the three-dimensional shape model. The mode setting unit 47 selectively sets a first mode (first measurement mode in this embodiment) and a second mode (second measurement mode in this embodiment). In the first measurement mode, model fitting is performed (simultaneously) using measurement information obtained from the two-dimensional image input by the two-dimensional image input unit 41 and that obtained from the distance image obtained by the three-dimensional coordinate information obtaining unit 43. In the second measurement mode, model fitting is performed using (only) the two-dimensional image input by the two-dimensional image input unit 41.

In the model fitting (first measurement mode) using measurement information obtained from the two-dimensional image and that obtained from the distance image, the position/orientation of the object can accurately be measured. On the other hand, the measurement data of an object end may partially be lost due to the characteristics of the distance sensor. For this reason, the reliability of distance measurement of an object end is poor if, for example, the object is small, slim, or rough. In addition, the distance sensor has a limited resolving power in the depth direction. For example, if the object is thin like paper, distance data that is almost the same as that of a table or another object underneath may be obtained, resulting in a measurement error.

In light of these cases, some measurement object shapes guarantee more accurate measurement by model fitting (second measurement mode) using the two-dimensional image but not the distance image than by model fitting (first measurement mode) using both the two-dimensional image and the distance image. In some cases, the degree of contribution of the distance image may be small at the time of measurement of the position/orientation of the object. Alternatively, a sufficient measurement accuracy may be ensured only by performing measurement using the two-dimensional image. If the distance image is not significant, as described above, measuring the position/orientation of the object using only the two-dimensional image may allow to suppress the calculation time and calculation resource and also improve the measurement accuracy.

In this embodiment, the shape of the three-dimensional shape model of the measurement object is analogized, and the measurement mode (the first measurement mode or the second measurement mode) is selectively set based on the analogized shape. The position/orientation of the object is measured in accordance with the set measurement mode.

The position/orientation measurement unit 46 measures (calculates) the position/orientation of the measurement object in accordance with the mode set by the mode setting unit 47. In the first measurement mode, the position/orientation measurement unit 46 fits the three-dimensional shape model held by the three-dimensional shape model holding unit 45 to the image features detected by the image feature detection unit 42. In the first measurement mode, the three-dimensional shape model is also fitted to the three-dimensional point cloud obtained by the three-dimensional coordinate information obtaining unit 43. Position/orientation calculation processing is thus executed to measure (calculate) the position/orientation of the measurement object. On the other hand, in the second measurement mode, the position/orientation measurement unit 46 fits the three-dimensional shape model held by the three-dimensional shape model holding unit 45 to the image features detected by the image feature detection unit 42. Position/orientation calculation processing is thus executed to measure (calculate) the position/orientation of the measurement object.

Figure 3:
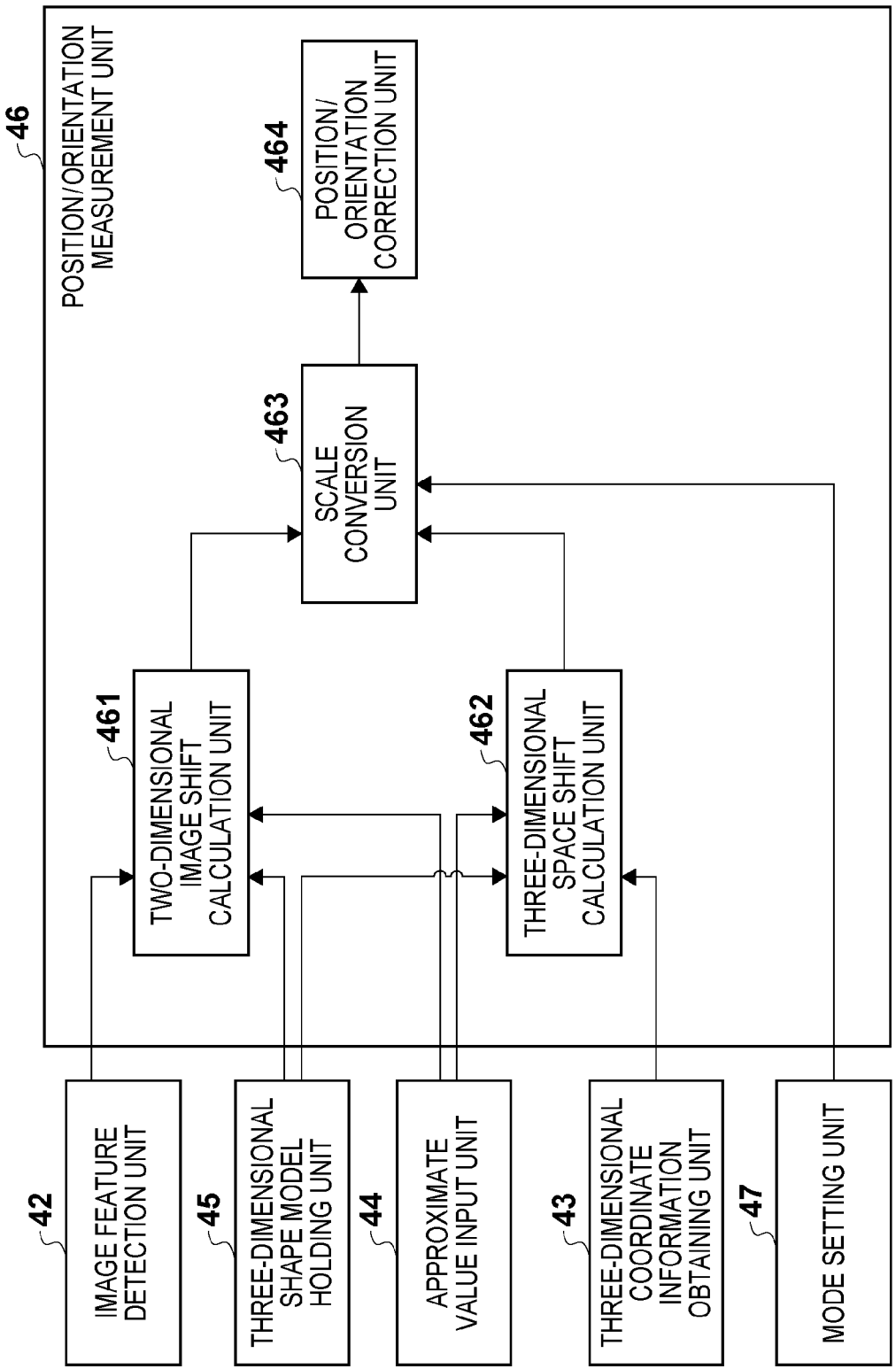
FIG. 3 is a block diagram showing an example of the functional arrangement of a position/orientation measurement unit 46 shown in FIG. 1.

An example of the functional arrangement of the position/orientation measurement unit 46 shown in FIG. 1 will be explained next with reference to FIG. 3.

The position/orientation measurement unit 46 includes a two-dimensional image shift calculation unit 461, a three-dimensional space shift calculation unit 462, a scale conversion unit 463, and a position/orientation correction unit 464.

The two-dimensional image shift calculation unit 461 calculates the distance on the two-dimensional image between each image feature (edge) detected on the two-dimensional image and the projected image (line segment) of the three-dimensional shape model on the two-dimensional image. Note that the projected image of the three-dimensional shape model is projected based on the approximate value of the position/orientation of the measurement object and the internal parameters (for example, calibrated values) of the two-dimensional image capturing unit 20.

The three-dimensional space shift calculation unit 462 calculates the distance in the three-dimensional space between each point of the three-dimensional point cloud data generated based on the distance image and each plane of the three-dimensional shape model.

The scale conversion unit 463 matches the scales of the distances calculated by the two-dimensional image shift calculation unit 461 and the three-dimensional space shift calculation unit 462 to each other. More specifically, the signed distance between a corresponding point (point) and the projected image (line segment) on the two-dimensional image is calculated. The signed distance between a point of the three-dimensional point cloud data in the three-dimensional space and a plane of the three-dimensional shape model is calculated. The two signed distances are linearly approximated as the function of the position/orientation of the object. A linear equation that holds for each measurement information at signed distance=0 is prepared.

The position/orientation correction unit 464 solves the linear equations as simultaneous equations, thereby obtaining a small change in the position/orientation of the object. The measured value representing the position/orientation of the object is corrected based on the obtained value. A final measured value is calculated by repeating this processing.

An example of the arrangement of the position/orientation measurement apparatus 40 has been described above. Note that the above-described position/orientation measurement apparatus 40 incorporates a computer. The computer includes a main control means such as a CPU and storage means such as a ROM (Read Only Memory), a RAM (Random Access Memory), and an HDD (Hard Disk Drive). The computer may also include input/output means such as buttons and a display or a touch panel, and a communication means such as a network card. Note that these components are connected by a bus or the like and controlled by causing the main control means to execute programs stored in the storage means.

An example of the procedure of processing of measuring the position/orientation of the measurement object in the position/orientation measurement apparatus 40 shown in FIG. 1 will be described next with reference to FIG. 4.

(S101)

The position/orientation measurement apparatus 40 causes the approximate value input unit 44 to input the approximate value of the position/orientation of the object with respect to the position/orientation measurement apparatus 40. In this embodiment, a value the position/orientation measurement apparatus 40 has measured in the past (for example, immediately before) from the object is used as the approximate value of the position/orientation of the object, as described above.

(S102)

The position/orientation measurement apparatus 40 causes the two-dimensional image input unit 41 to input a two-dimensional image captured by the two-dimensional image capturing unit 20.

(S103)

The position/orientation measurement apparatus 40 causes the three-dimensional coordinate information obtaining unit 43 to obtain three-dimensional coordinate information measured by the distance image measurement unit 30. As described above, the three-dimensional coordinate information obtaining unit 43 converts the pixels of the distance image into three-dimensional point cloud data on the camera coordinate system (the coordinate system of the two-dimensional image capturing unit 20) and obtains it as the three-dimensional coordinate information.

(S104)

The position/orientation measurement apparatus 40 causes the image feature detection unit 42 to detect image features representing the measurement object from the two-dimensional image input by the process of step S102. In this embodiment, edges are detected as the image features, as described above.

Figure 5A:
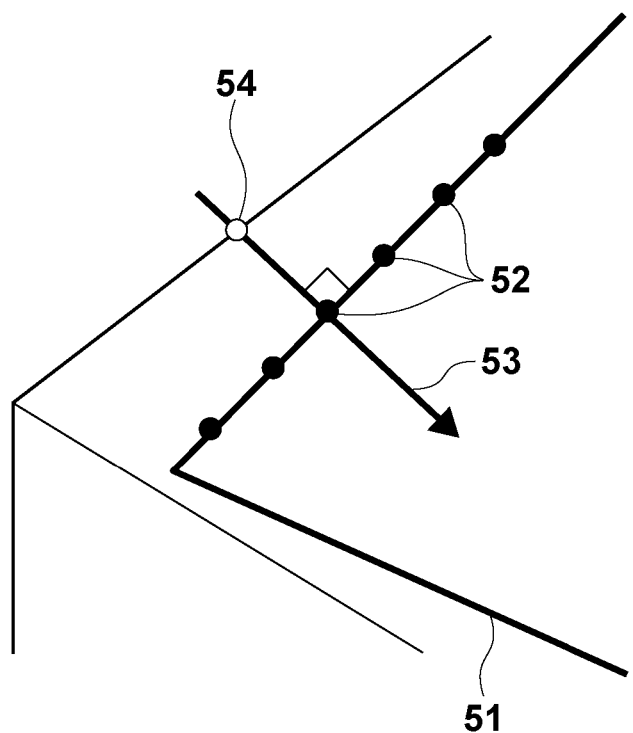
FIGS. 5A and 5B are views showing an example of the outline of edge detection.
Figure 5B:
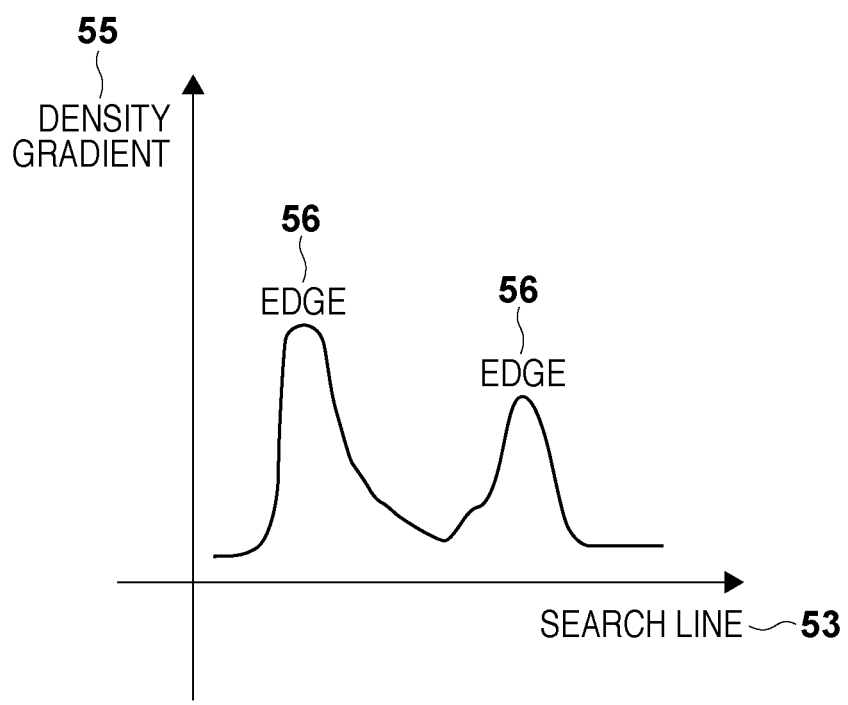

An example of the outline of edge detection according to this embodiment will be explained with reference to FIGS. 5A and 5B. In edge detection processing, first, the three-dimensional shape model is projected onto the two-dimensional image obtained by capturing the measurement object. The projected image (line segment) is obtained based on the approximate value of the position/orientation of the measurement object input by the process of step S101 and the internal parameters (for example, calibrated values) of the two-dimensional image capturing unit 20. Next, control points 52 are set at equal intervals on each projected line segment 51. An edge 56 is one-dimensionally searched for from a line segment (to be referred to as a search line hereinafter) 53 that runs in parallel to the normal direction of the line segment 51 and passes through the control point 52 (FIG. 5A). The edge corresponds to an extreme value of the density gradient of the pixel values (FIG. 5B). A plurality of edges may be detected from the search line 53 according to circumstances. In this case, the plurality of detected edges are held hypotheses in this embodiment (see L. Vacchetti, V. Lepetit, and P. Fua, "Combining edge and texture information for real-time accurate 3D camera tracking, "Proc. 3rd IEEE/ACM International Symposium on Mixed and Augmented Reality (ISMAR '04), pp. 48-57, 2004). The edge 56 corresponding to each control point 52 is searched for in this way.

(S105)

The position/orientation measurement apparatus 40 causes the shape analogizing unit 48 to analogize the shape of the three-dimensional shape model held by the three-dimensional shape model holding unit 45. The shape of the three-dimensional shape model may be replaced with, for example, a bounding box (rectangular parallelepiped) including the three-dimensional shape model. The bounding box has planes perpendicularly intersecting the X-, Y-, and Z-axes of the three-dimensional coordinate system to which the three-dimensional shape model belongs. Note that the planes of the bounding box are decided based on the maximum and minimum values including the three-dimensional shape model on the X-, Y-, and Z-axes (Axis-Aligned-Bounding-Box). Alternatively, a bounding box conforming to the three-dimensional shape model may be formed. The shape analogizing unit 48 obtains the bounding box to replace the three-dimensional shape model, and then analogizes the shape of the three-dimensional shape model based on the side lengths (x1, y1, and z1) and the side ratios (x1/y1, x1/z1, y1/x1, y1/z1, z1/x1, and z1/y1). Note that the shape of the three-dimensional shape model may be analogized without using a bounding box. For example, it may be obtained by combining element models (primitive models) prepared in advance. Employing this method enables to analogize whether the three-dimensional shape model is rough or not.

The shape of the three-dimensional shape model is analogized in accordance with, for example, following rules.

1) When all the side lengths are smaller than a predetermined first threshold (for example, 1 cm), the three-dimensional shape model is analogized to be small.

2) Assume that two of the side ratios are larger than a predetermined second threshold (for example, 10), and other two of the side ratios are smaller than a predetermined third threshold (for example, 0.1). Also assume that one of the side lengths is larger than a predetermined fourth threshold (for example, 3 cm). In this case, the three-dimensional shape model is analogized to be slim.

3) Assume that two of the side ratios are larger than the predetermined second threshold (for example, 10), and other two of the side ratios are smaller than the predetermined third threshold (for example, 0.1). Also assume that two of the side lengths are larger than the predetermined fourth threshold (for example, 3 cm). In this case, the three-dimensional shape model is analogized to be thin.

(S106)

Next, the position/orientation measurement apparatus 40 causes the mode setting unit 47 to set the measurement mode based on the shape of the three-dimensional shape model analogized by the process of step S105. That is, it is determined based on the shape of the measurement object (three-dimensional shape model) whether to perform measurement using the measurement information obtained by the distance image. One of the first measurement mode and the second measurement mode is set based on the determination result. The initial mode is the first measurement mode.

For example, when the three-dimensional shape model has at least one of small, slim, rough, and thin shapes, the measurement mode is switched from the first measurement mode to the second measurement mode. This is because the measurement by the distance sensor (distance image measurement unit 30) contains an error at high probability, as described above. In the second measurement mode, the position/orientation of the object is measured without using the measurement information obtained from the distance image. Hence, the measurement can be done at a high accuracy even if the measurement by the distance sensor contains an error. Note that if the three-dimensional shape model has a shape other than the small, slim, rough, and thin shapes, the first measurement mode is set (maintained).

(S107)

The position/orientation measurement apparatus 40 causes the position/orientation measurement unit 46 to measure (calculate) the position/orientation of the measurement object in accordance with the mode set by the process of step S106. The three-dimensional shape model is fitted to at least either of the image features (edges) detected by the process of step S104 and the three-dimensional coordinate information (three-dimensional point cloud) input by the process of step S103 based on the mode set by the process of step S106, and this will be described later in detail. The position/orientation of the measurement object is thus obtained.

An example of the operation of the position/orientation measurement unit 46 in step S107 of FIG. 4 will be described. The procedure of processing in the first measurement mode will be explained first. In the first measurement mode, the distance on the two-dimensional image (the distance between the edge and the projected image) is converted into the distance in the three-dimensional space, thereby unifying the scales. This eliminates localization of the degrees of contribution of the two methods.

Figure 6:
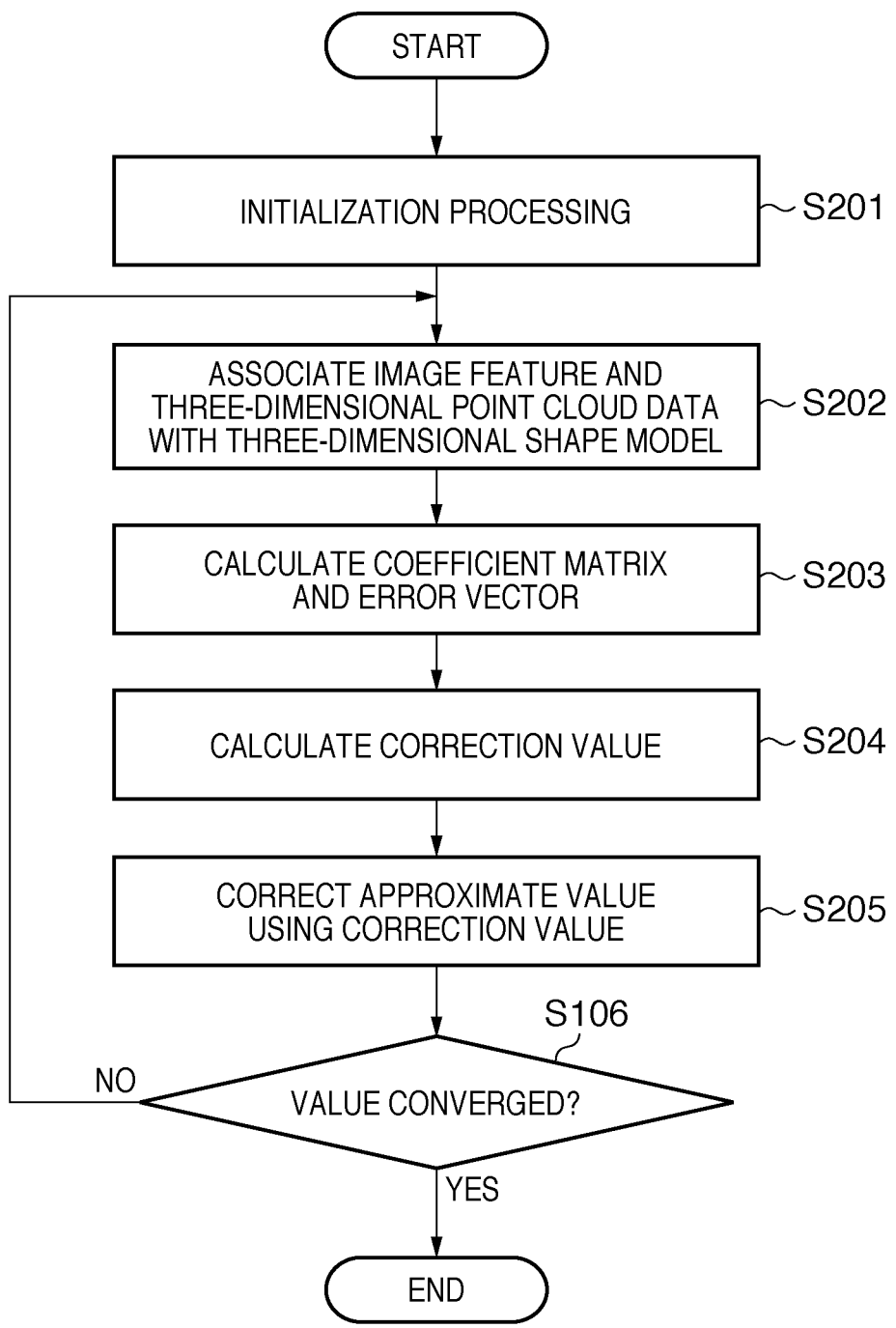
FIG. 6 is a flowchart illustrating an example of the procedure of position/orientation calculation processing in a first measurement mode.

FIG. 6 illustrates an example of the procedure of position/orientation calculation processing in the first measurement mode. In this processing, an iterative operation is performed by the Gauss-Newton method to correct the approximate value of the position/orientation (to be represented by a 6-dimensional vector s hereinafter) of the measurement object. The position/orientation of the measurement object is thus obtained. Note that the position/orientation calculation processing is not limited to the Gauss-Newton method. For example, the Levenberg-Marquardt method that is more robust in calculation or the simpler method of steepest descent may be used. Any other nonlinear non-linear optimization method such as the conjugate gradient method or the ICCG method is also usable.

(S201)

The position/orientation measurement apparatus 40 first causes the position/orientation measurement unit 46 to perform initialization processing. In this initialization processing, the position/orientation measurement unit 46 obtains, for example, the approximate value of the position/orientation of the measurement object obtained by the process of step S101 in FIG. 4.

(S202)

The position/orientation measurement apparatus 40 causes the position/orientation measurement unit 46 to associate the image features (edges) and the three-dimensional point cloud data (the three-dimensional point cloud data based on the distance image) with the three-dimensional shape model. In this processing, first, each line segment of the three-dimensional shape model is projected onto the two-dimensional image based on the approximate value obtained by the process of step S201. For each projected line segment, the nearest image feature (edge) on the two-dimensional image is associated with a control point. The image features (edges) and the three-dimensional shape model are thus associated with each other.

In addition, coordinate transformation of the three-dimensional shape model or the three-dimensional point cloud data is performed based on the approximate value obtained by the process of step S201. For each point of the three-dimensional point cloud data, the nearest plane of the three-dimensional shape model in the three-dimensional space is searched for. The three-dimensional point cloud data and the three-dimensional shape model are thus associated with each other.

(S203)

The position/orientation measurement apparatus 40 causes the position/orientation measurement unit 46 to calculate a coefficient matrix to solve the simultaneous linear equations and error vectors (edges and three-dimensional point cloud data). Each element of the coefficient matrix is a first-order partial differential coefficient for the small change in the approximate value obtained by the process of step S201. Each element concerning the edges is a first-order partial differential coefficient that represents the distance between a corresponding point (point) and the projected image (line segment) on the two-dimensional image as the function of position/orientation. Each element concerning the three-dimensional point cloud data is a first-order partial differential coefficient that represents the distance between a point in the three-dimensional point cloud data and a plane of the three-dimensional shape model in the three-dimensional space as the function of position/orientation.

Figure 7:
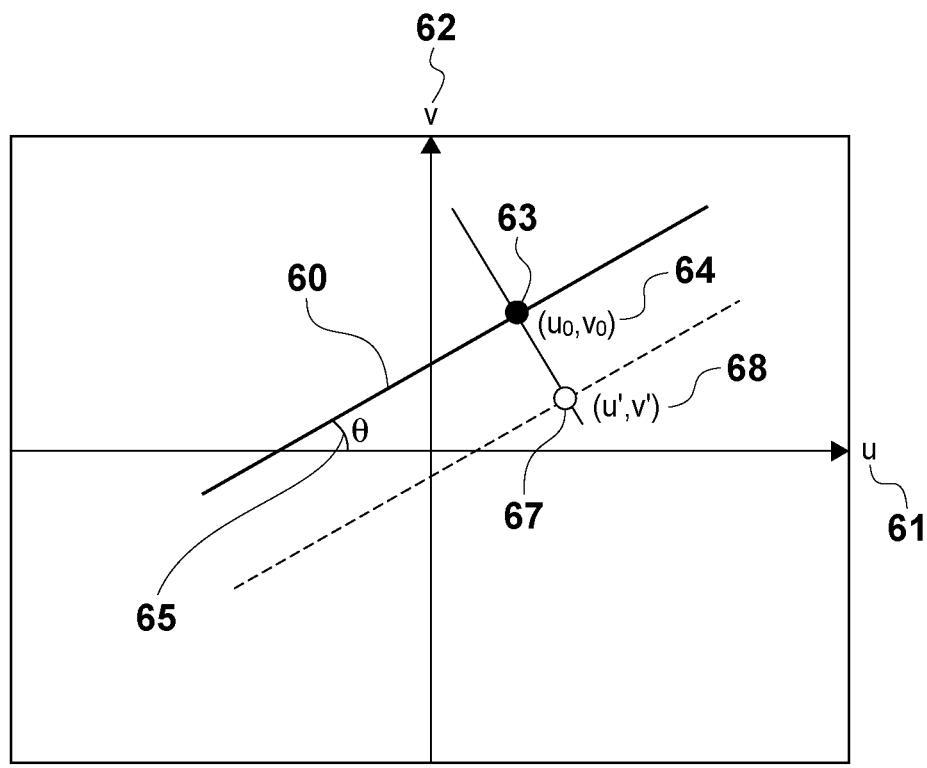
FIG. 7 is a view showing an example of the relationship between a projected image (line segment) and a detected edge.

The coefficient matrix calculation method will be explained. FIG. 7 is a view showing an example of the relationship between the projected image (line segment) and a detected edge. In this case, a u-axis 61 is set in the horizontal direction of the image, and a v-axis 62 is set in the vertical direction. Coordinates 64 of a given control point (one of points that equally divide a projected line segment on the image) 63 on the image are represented by $(u_0, v_0)$. The slope (the slope with respect to the u-axis) of a line segment L on the image, to which the control point belongs, is represented by θ. A slope 65 indicates the slope of a line that connects the coordinates of two ends of a line segment (projected line segment) 66 whose three-dimensional coordinates of the two ends are projected onto the image (two-dimensional image) based on position/orientation s. The normal vector of the line segment 66 on the image is (sin θ,−cos θ). Coordinates 68 of a point (corresponding point 67) corresponding to the control point on the image are represented by (u',v'). A point (u,v) on a line (broken line) that passes through the coordinates (u',v') of the corresponding point 67 and has the slope 65 represented by θ is represented by $$u \sin\theta - v\cos\theta = d \quad (1)$$

where θ is a constant, and d is a constant given by $$d = u'\sin\theta - v'\cos\theta$$

The position of the control point 63 on the image changes depending on the position/orientation of the measurement object. The position/orientation s of the measurement object has six degrees of freedom. That is, s is a 6-dimensional vector including three elements representing the position of the measurement object and three elements representing the orientation. The three elements representing the orientation are expressed by, for example, Eulerian angles or a three-dimensional vector that represents the rotation axis passing through the origin by the direction and the rotation angle by the magnitude. The coordinates of the point on the image, which change depending on the position/orientation of the measurement object, can be approximated, by first-order Taylor expansion near the control point 63 (that is, the coordinates $(u_0, v_0)$ 64), to $$u \approx u_0 + \sum_{i=1}^{6} \frac{\partial u}{\partial s_i} \Delta s_i \quad (2)$$

$$v \approx v_0 + \sum_{i=1}^{6} \frac{\partial v}{\partial s_i} \Delta s_i$$

where $\Delta s_i$ (i=1, 2, ..., 6) represents the small change of the respective components.

Assume that the difference between the approximate value of the position/orientation of the object and the actual position/orientation of the object is not so large. In this case, the position of the control point 63 on the image, which is obtained by the correct position/orientation s, is assumed to be on the line represented by expression (1). When u and v approximated by expressions (2) are substituted into expression (1), we obtain $$\sin\theta \sum_{i=1}^{6} \frac{\partial u}{\partial s_i}\Delta s_i - \cos\theta \sum_{i=1}^{6} \frac{\partial v}{\partial s_i}\Delta s_i = d - r \quad (3)$$

where r is a constant given by $$r = u_0 \sin\theta - v_0 \cos\theta$$

Expression (3) can hold for all edges associated by the process of step S202.

The three-dimensional coordinates of the three-dimensional point cloud data represented by the coordinate system of the two-dimensional image capturing unit 20 can be transformed into three-dimensional coordinates (x,y,z) on the coordinate system of the measurement object using its position/orientation s. Assume that a point in the three-dimensional point cloud data is transformed into coordinates $(x_0, y_0, z_0)$ on the coordinate system of the measurement object by the approximate value obtained by the process of step S201. The coordinates (x,y,z) change depending on the position/orientation of the measurement object and can therefore be approximated, by first-order Taylor expansion near the coordinates $(x_0, y_0, z_0)$, to $$x \approx x_0 + \sum_{i=1}^{6} \frac{\partial x}{\partial s_i}\Delta s_i \quad (4)$$

$$y \approx y_0 + \sum_{i=1}^{6} \frac{\partial y}{\partial s_i}\Delta s_i$$

$$z \approx z_0 + \sum_{i=1}^{6} \frac{\partial z}{\partial s_i}\Delta s_i$$

Assume that the equation on the coordinate system of the measurement object for the plane of the three-dimensional shape model associated with a given point in the three-dimensional point cloud data by the process of step S202 is "ax+by+cz=e ($a^2+b^2+c^2=1$; a, b, c, and e are constants)". Assume that the coordinates (x,y,z) transformed by the correct position/orientation s satisfy the equation of the plane "ax+by+cz=e". When expressions (4) are substituted into the equation of the plane, we obtain $$a\sum_{i=1}^{6}\frac{\partial x}{\partial s_i}\Delta s_i + b\sum_{i=1}^{6}\frac{\partial y}{\partial s_i}\Delta s_i + c\sum_{i=1}^{6}\frac{\partial z}{\partial s_i}\Delta s_i = e - q \quad (5)$$

where q is a constant given by $$q = ax_0 + by_0 + cz_0$$

Expression (5) can hold for all three-dimensional point cloud data associated by the process of step S202.

Expressions (3) and (5) are equations for the small change $\Delta s_i$ (i=1, 2, ..., 6) of the respective components of the position/orientation s. For this reason, concerning $\Delta s_i$, simultaneous linear equations concerning $\Delta s_i$ hold as follows.

$$\begin{bmatrix} \sin\theta_1\frac{\partial u_1}{\partial s_1} - \cos\theta_1\frac{\partial v_1}{\partial s_1} & \sin\theta_1\frac{\partial u_1}{\partial s_2} - \cos\theta_1\frac{\partial v_1}{\partial s_2} & \cdots & \sin\theta_1\frac{\partial u_1}{\partial s_6} - \cos\theta_1\frac{\partial v_1}{\partial s_6} \\ \sin\theta_2\frac{\partial u_2}{\partial s_1} - \cos\theta_1\frac{\partial v_2}{\partial s_1} & \sin\theta_2\frac{\partial u_2}{\partial s_2} - \cos\theta_1\frac{\partial v_2}{\partial s_2} & \cdots & in\theta_2\frac{\partial u_2}{\partial s_6} - \cos\theta_1\frac{\partial v_2}{\partial s_6} \\ \vdots & \vdots & \ddots & \vdots \\ a_1\frac{\partial x_1}{\partial s_1} + b_1\frac{\partial y_1}{\partial s_1} + c_1\frac{\partial z_1}{\partial s_1} & a_1\frac{\partial x_1}{\partial s_2} + b_1\frac{\partial y_1}{\partial s_2} + c_1\frac{\partial z_1}{\partial s_2} & \cdots & a_1\frac{\partial x_1}{\partial s_6} + b_1\frac{\partial y_1}{\partial s_6} + c_1\frac{\partial z_1}{\partial s_6} \\ a_2\frac{\partial x_2}{\partial s_1} + b_2\frac{\partial y_2}{\partial s_1} + c_2\frac{\partial z_2}{\partial s_1} & a_2\frac{\partial x_2}{\partial s_2} + b_2\frac{\partial y_2}{\partial s_2} + c_2\frac{\partial z_2}{\partial s_2} & \cdots & a_2\frac{\partial x_2}{\partial s_6} + b_2\frac{\partial y_2}{\partial s_6} + c_2\frac{\partial z_2}{\partial s_6} \\ \vdots & \vdots & \vdots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \quad (6)$$

$$\begin{bmatrix} d_1 - r_1 \\ d_2 - r_2 \\ \vdots \\ e_1 - q_1 \\ e_2 - q_2 \\ \vdots \end{bmatrix}$$

The error vector on the right-hand side of expression (6) represents the signed distance on the two-dimensional image for the edge, or the signed distance in the three-dimensional space for the three-dimensional point cloud data, as described above. Hence, the scales do not match. The error on the two-dimensional image is multiplied by the depth of the edge, thereby approximating the error on the two-dimensional image to the error in the three-dimensional space. More specifically, both sides of the equation for the edge are multiplied by the depth of the edge. This allows to unify the error scales to the distances in the three-dimensional space. Note that since the depth information cannot be obtained from the two-dimensional image, the depth of the edge needs to be obtained by some approximate method.

Figure 8:
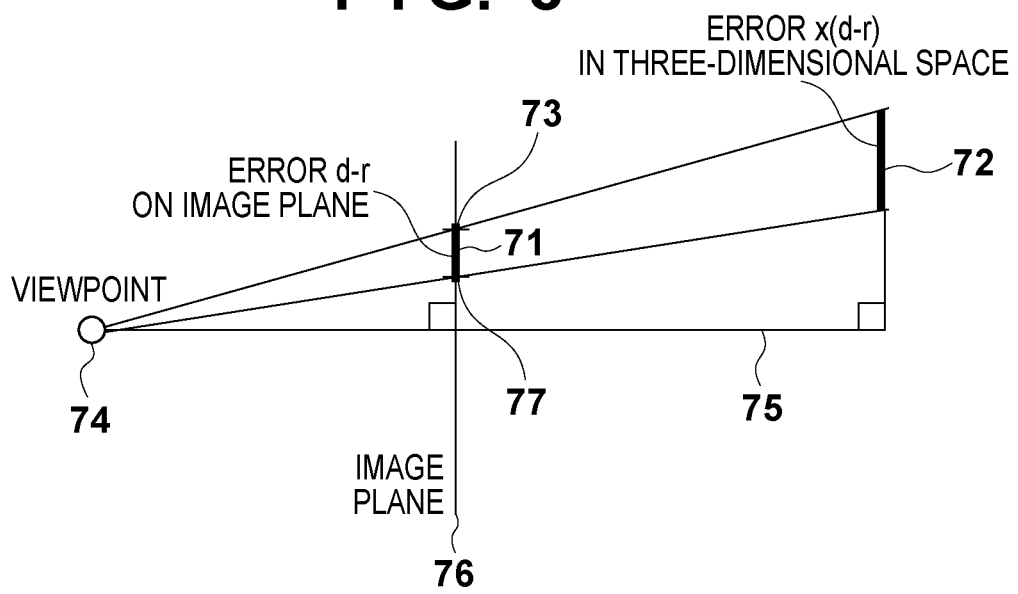
FIG. 8 is a view showing an example of the outline of processing of dimension-converting an error on a two-dimensional image.

An example of the method of approximating an error 71 on the two-dimensional image to an error 72 in the three-dimensional space will be described with reference to FIG. 8. In this embodiment, the error 71 on the two-dimensional image is multiplied by a depth 75, from a viewpoint 74, of a control point 73 calculated based on the approximate value of the position/orientation of the object. The error 71 on the two-dimensional image is thus converted into the error 72 in the three-dimensional space. The error may be multiplied not by the depth 75 but by a scaling coefficient corresponding to the length of a perpendicular from the control point 73 in the three-dimensional space to a viewpoint vector passing through an edge 77 on an image plane 76.

The simultaneous equations to be solved are $$\begin{bmatrix} z_1\left(\sin\theta_1\frac{\partial u_1}{\partial s_1} - \cos\theta_1\frac{\partial v_1}{\partial s_1}\right) & z_1\left(\sin\theta_1\frac{\partial u_1}{\partial s_2} - \cos\theta_1\frac{\partial v_1}{\partial s_2}\right) & \cdots & z_1\left(\sin\theta_1\frac{\partial u_1}{\partial s_6} - \cos\theta_1\frac{\partial v_1}{\partial s_6}\right) \\ z_2\left(\sin\theta_2\frac{\partial u_2}{\partial s_1} - \cos\theta_1\frac{\partial v_2}{\partial s_1}\right) & z_2\left(\sin\theta_2\frac{\partial u_2}{\partial s_2} - \cos\theta_1\frac{\partial v_2}{\partial s_2}\right) & \cdots & z_2\left(\sin\theta_2\frac{\partial u_2}{\partial s_6} - \cos\theta_1\frac{\partial v_2}{\partial s_6}\right) \\ \vdots & \vdots & \ddots & \vdots \\ a_1\frac{\partial x_1}{\partial s_1} + b_1\frac{\partial y_1}{\partial s_1} + c_1\frac{\partial z_1}{\partial s_1} & a_1\frac{\partial x_1}{\partial s_2} + b_1\frac{\partial y_1}{\partial s_2} + c_1\frac{\partial z_1}{\partial s_2} & \cdots & a_1\frac{\partial x_1}{\partial s_6} + b_1\frac{\partial y_1}{\partial s_6} + c_1\frac{\partial z_1}{\partial s_6} \\ a_2\frac{\partial x_2}{\partial s_1} + b_2\frac{\partial y_2}{\partial s_1} + c_2\frac{\partial z_2}{\partial s_1} & a_2\frac{\partial x_2}{\partial s_2} + b_2\frac{\partial y_2}{\partial s_2} + c_2\frac{\partial z_2}{\partial s_2} & \cdots & a_2\frac{\partial x_2}{\partial s_6} + b_2\frac{\partial y_2}{\partial s_6} + c_2\frac{\partial z_2}{\partial s_6} \\ \vdots & \vdots & \vdots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \quad (7)$$

$$\begin{bmatrix} z_1(d_1 - r_1) \\ z_2(d_2 - r_2) \\ \vdots \\ e_1 - q_1 \\ e_2 - q_2 \\ \vdots \end{bmatrix}$$

Expression (7) is represented by $$J\Delta s = E \quad (8)$$

To calculate the coefficient matrix J of the simultaneous linear equations, partial differential coefficients are calculated.

(S204)

Subsequently, the position/orientation measurement apparatus 40 causes the position/orientation measurement unit 46 to obtain a correction value Δs using the generalized inverse matrix $(J^T \cdot J)^{-1} \cdot J^T$ of the matrix J based on expression (8). Since the edge or three-dimensional point cloud data includes many outliers resulted from detection errors, a robust estimation method to be described below is used. Generally, for an edge or point cloud data containing an outlier, the value of the error vector on the right-hand side of expression (7) becomes large. Hence, a small weight is given to data having a large absolute error value, whereas a large weight is given to data having a small absolute error value. The weights given by, for example, Tukey functions represented by $$w(z(d-r)) = \begin{cases} (1 - (z(d-r)/c_1)^2)^2 & |z(d-r)| \le c_1 \\ 0 & |z(d-r)| > c_1 \end{cases} \quad (9)$$

$$w(e-q) = \begin{cases} (1 - ((e-q)/c_2)^2)^2 & |e-q| \le c_2 \\ 0 & |e-q| > c_2 \end{cases}$$

where $C_1$ and $C_2$ are constants.

Note that the functions to give the weights need not always be the Tukey functions and need only to give a small weight to data having a large absolute error value and a large weight to data having a small absolute error value. For example, Huber functions or the like may be used.

Let $w_i$ be the weight corresponding to each measurement information (edge or point cloud data). A weight matrix W is defined by $$W = \begin{bmatrix} w_1 & & & 0 \\ & w_2 & & \\ & & \ddots & \\ 0 & & & w_{N_c} \end{bmatrix} \quad (10)$$

The weight matrix W is a square matrix that has 0 for all components other than the diagonal components. The diagonal components have the weights $w_i$. Using the weight matrix W, expression (8) is rewritten as $$WJ\Delta s = WE \quad (11)$$

Expression (11) is solved to $$\Delta s = (J^T W J)^{-1} J^T W E \quad (12)$$

thereby obtaining the correction value Δs.

(S205)

The position/orientation measurement apparatus 40 causes the position/orientation measurement unit 46 to correct the approximate value obtained by the process of step S201 using the correction value Δs calculated by the process of step S204. The position/orientation of the measurement object is thus obtained.

$$s \leftarrow s + \Delta s$$

(S206)

The position/orientation measurement apparatus 40 causes the position/orientation measurement unit 46 to determine whether the measured value of the position/orientation of the measurement object has converged. If the value has converged, the processing ends. Otherwise, the process returns to step S202. Note that the value is determined to have converged when the correction value Δs is almost 0, or the difference between the sum of squares of the error vector before correction and that after correction is almost 0.

The procedure of processing in the second measurement mode will be explained next. In the second measurement mode, the position/orientation of the object is calculated by solving expression (3) described above. In the second measurement mode, the three-dimensional point cloud data generated based on the distance image is not used to measure the position/orientation of the object. Hence, the three-dimensional space shift calculation unit 462 shown in FIG. 3 does not perform processing. The scale conversion unit 463 does not perform distance shift scale conversion, either.

In the second measurement mode, processing is done in accordance with the same procedure as that in the first measurement mode described with reference to FIG. 6, and a description using the drawing will be omitted here. Different points are, for example, the absence of three-dimensional point cloud data association in the process of step S202 and the absence of scale conversion in the process of step S203.

As described above, according to the first embodiment, the mode is set based on the shape of the three-dimensional shape model, and the position/orientation of the measurement object is measured (calculated) in accordance with the mode. This allows to perform measurement using a method according to the shape of the measurement object and thus improve the measurement accuracy, processing speed, and robustness.

Figure 9:
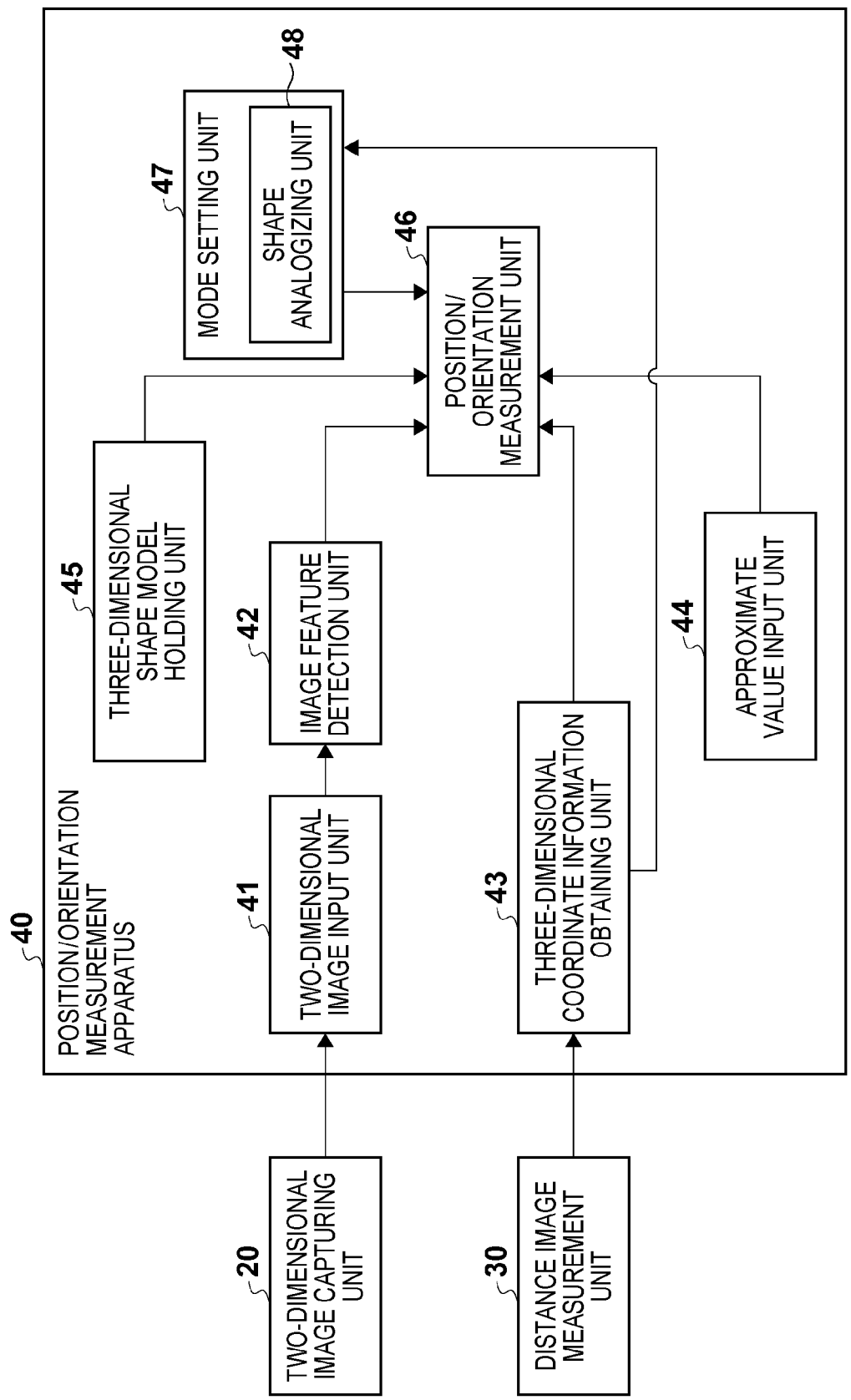
FIG. 9 is a block diagram showing another example of the functional arrangement of the position/orientation measurement apparatus 40 according to the embodiment.

Note that in the above-described first embodiment, the mode is selectively set based on the shape of the three-dimensional shape model. However, the present invention is not limited to this. For example, the mode may be set based on the distance image measured by the distance image measurement unit 30. In this case, the mode setting unit 47 of the position/orientation measurement apparatus 40 receives three-dimensional point cloud data obtained by the three-dimensional coordinate information obtaining unit 43, as shown in FIG. 9. This allows the shape analogizing unit 48 to analogize the shape of the measurement object based on the three-dimensional point cloud data generated based on the distance image and the mode setting unit 47 to set the mode based on the analogized shape.

Second Embodiment

The second embodiment will be described next. In the second embodiment, a case will be described in which the measurement mode is set based on the shape of a three-dimensional shape model and measurement information obtained from a distance image.

Figure 10:
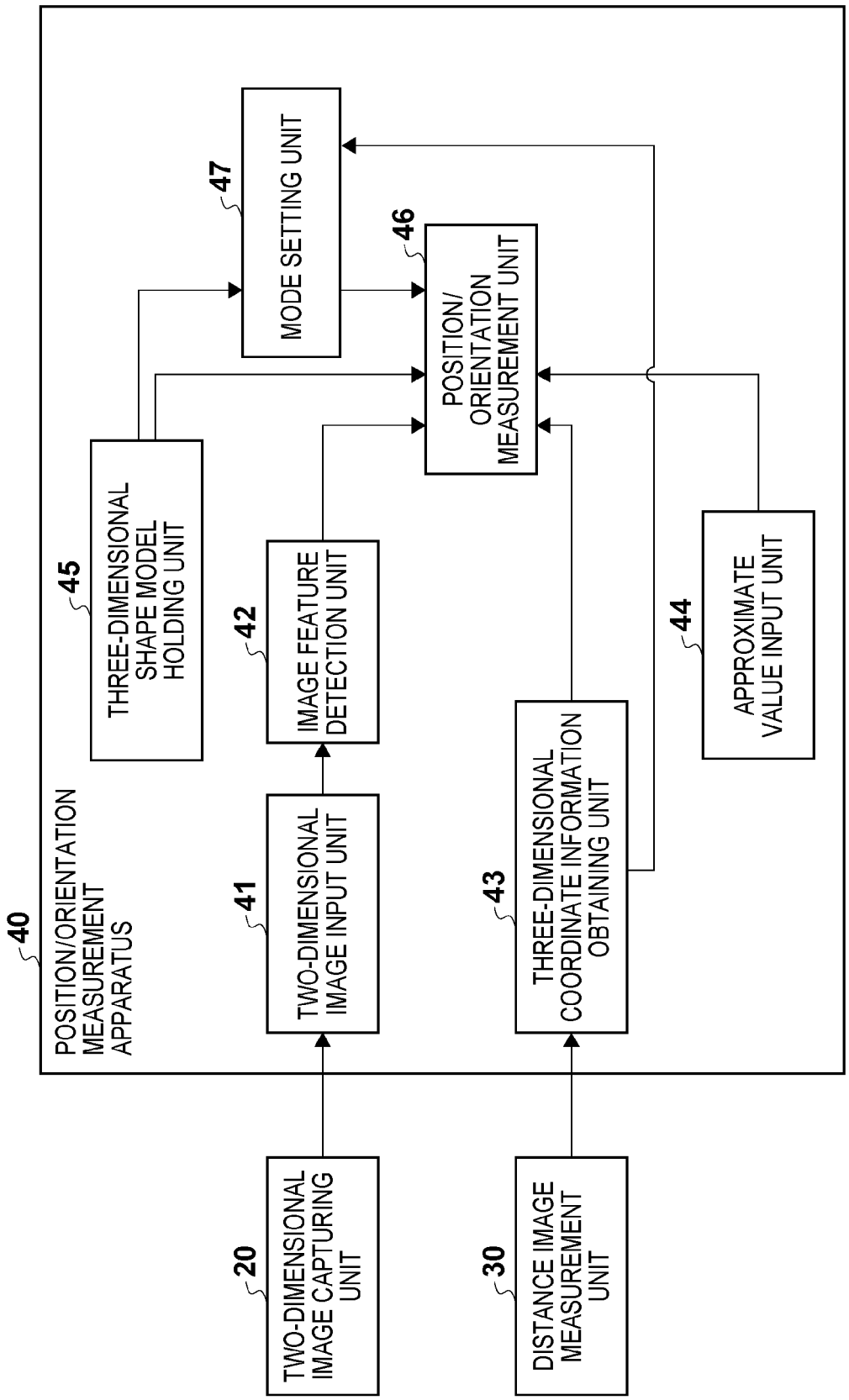
FIG. 10 is a block diagram showing an example of the functional arrangement of a position/orientation measurement apparatus 40 according to the second embodiment.

An example of the functional arrangement of a position/orientation measurement apparatus 40 according to the second embodiment will be described with reference to FIG. 10. Note that the parts denoted by the same reference numerals as in FIG. 1 described in the first embodiment basically have the same functions as in the first embodiment. Points different from the first embodiment will mainly be described here.

A point different from the first embodiment is mode setting processing by a mode setting unit 47. More specifically, the mode setting unit 47 sets the mode based on the shape of a three-dimensional shape model held by a three-dimensional shape model holding unit 45 and three-dimensional point cloud data obtained by a three-dimensional coordinate information obtaining unit 43.

To compare the two data, the mode setting unit 47 associates each point in the three-dimensional point cloud data with a surface on the three-dimensional shape model which is nearest to the point. As a result of association, if the number of points spaced apart from the three-dimensional shape model in the three-dimensional space is larger than a predetermined number, the mode setting unit 47 determines that the three-dimensional shape model largely differs from the distance data of the distance image, and sets the second measurement mode. That is, the position/orientation of the object is measured using measurement information obtained from the two-dimensional image.

If the number of points spaced apart from the three-dimensional shape model in the three-dimensional space is equal to or smaller than the predetermined number, the mode setting unit 47 determines that the three-dimensional shape model is relatively similar to the distance data of the distance image, and sets the first measurement mode. That is, the position/orientation of the object is measured using measurement information obtained from the two-dimensional image and measurement information obtained from the distance image. Note that out of the three-dimensional point cloud data, only the three-dimensional point cloud data of the measurement object may be selected by segmentation before comparison of two data.

Figure 4:
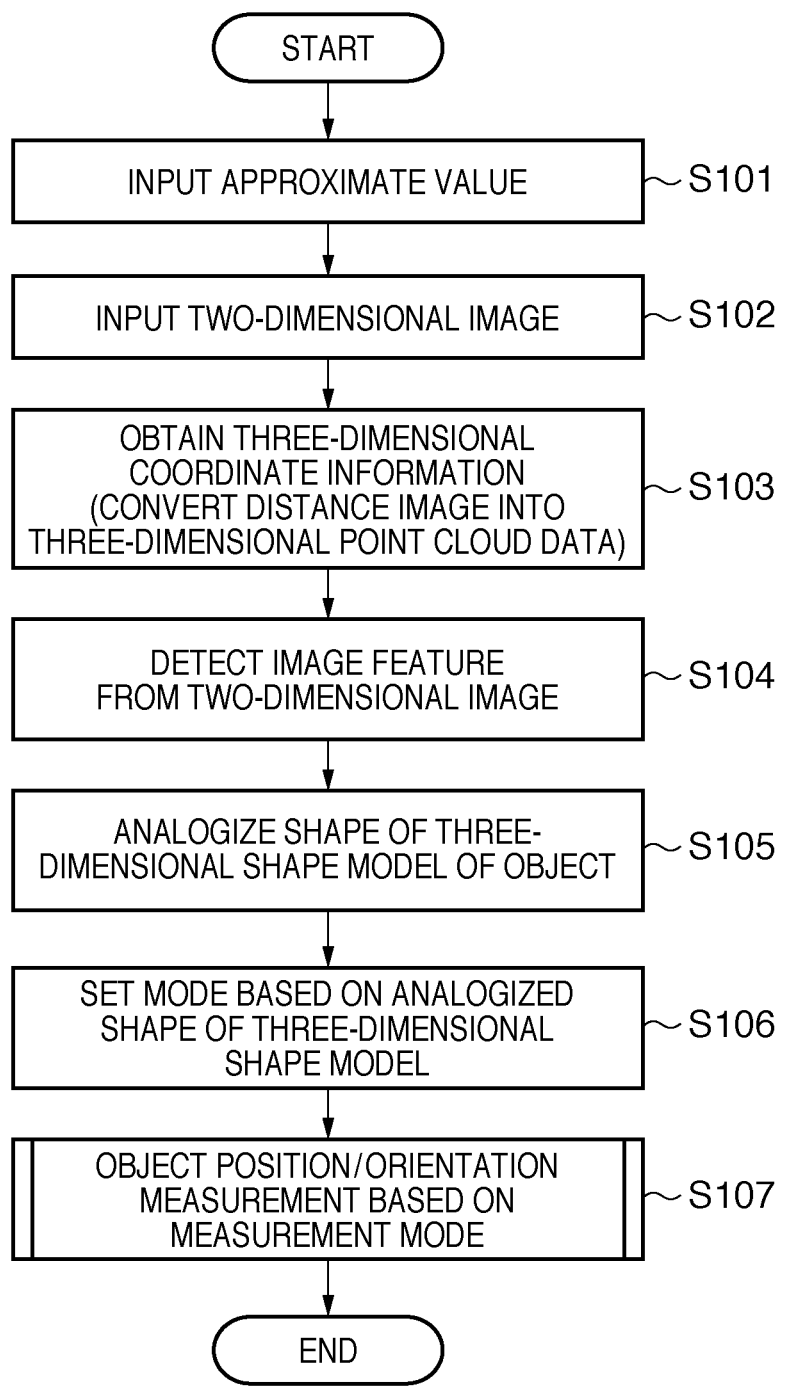
FIG. 4 is a flowchart illustrating an example of the operation of the position/orientation measurement apparatus 40 shown in FIG. 1.

Note that the processing in the position/orientation measurement apparatus 40 according to the second embodiment is performed in accordance with the same procedure as in FIG. 4 described in the first embodiment, and a description using the drawing will be omitted here. Different points are omission of the process of step S105 and the difference in the process of step S106. More specifically, in the process of step S106, the mode setting unit 47 sets the mode based on the shape of the three-dimensional shape model held by the three-dimensional shape model holding unit 45 and three-dimensional point cloud data obtained by the three-dimensional coordinate information obtaining unit 43.

As described above, according to the second embodiment, the shape of a three-dimensional shape model and measurement information obtained from a distance image (three-dimensional point cloud data generated based on the distance image) are compared. The mode is set based on the comparison result. More specifically, the shape of a three-dimensional shape model is compared with measurement information obtained from a distance image. Upon determining based on the comparison result that distance data largely different from the three-dimensional shape model has been measured, the distance image is unreliable, and the second measurement mode is set. Otherwise, the first measurement mode is set.

According to the second embodiment, it is therefore possible to measure the position/orientation of the object in a measurement mode more appropriate than in the arrangement of the first embodiment.

Third Embodiment

The third embodiment will be described next. In the third embodiment, a case will be described in which the measurement mode is set based on image features on a two-dimensional image. Additionally, in the third embodiment, the mode is switched between the above-described first measurement mode (first mode) and a new third measurement mode (second mode). In the third measurement mode, model fitting is performed using not measurement information obtained from a two-dimensional image but that obtained from a distance image.

Model fitting (first measurement mode) using measurement information (image features) obtained from a two-dimensional image and that (three-dimensional point cloud data) obtained from a distance image can accurately measure the position/orientation of an object. However, to perform the model fitting using image features obtained from a two-dimensional image, image features to some extent need to exist on the two-dimensional image. For example, if the surface of the measurement object rarely has a pattern (texture) or edges, measurement using the two-dimensional image is difficult. In addition, the measurement accuracy lowers.

Hence, some states (surface states) of the measurement object guarantee more accurate measurement by model fitting (third measurement mode) using the distance image than by model fitting (first measurement mode) using both the two-dimensional image and the distance image. In some cases, the degree of contribution of the two-dimensional image may be small at the time of measurement of the position/orientation of the object. Alternatively, a sufficient measurement accuracy may be ensured only by performing measurement using the distance image. If the image features are not significant, as described above, measuring the position/orientation of the object using only the distance image may allow to suppress the calculation time and calculation resource and also improve the measurement accuracy.

In the third embodiment, image features are detected from the two-dimensional image, and the measurement mode (the first measurement mode or the third measurement mode) is selectively set based on the measured image features. The position/orientation of the object is measured in accordance with the set measurement mode.

Figure 11:
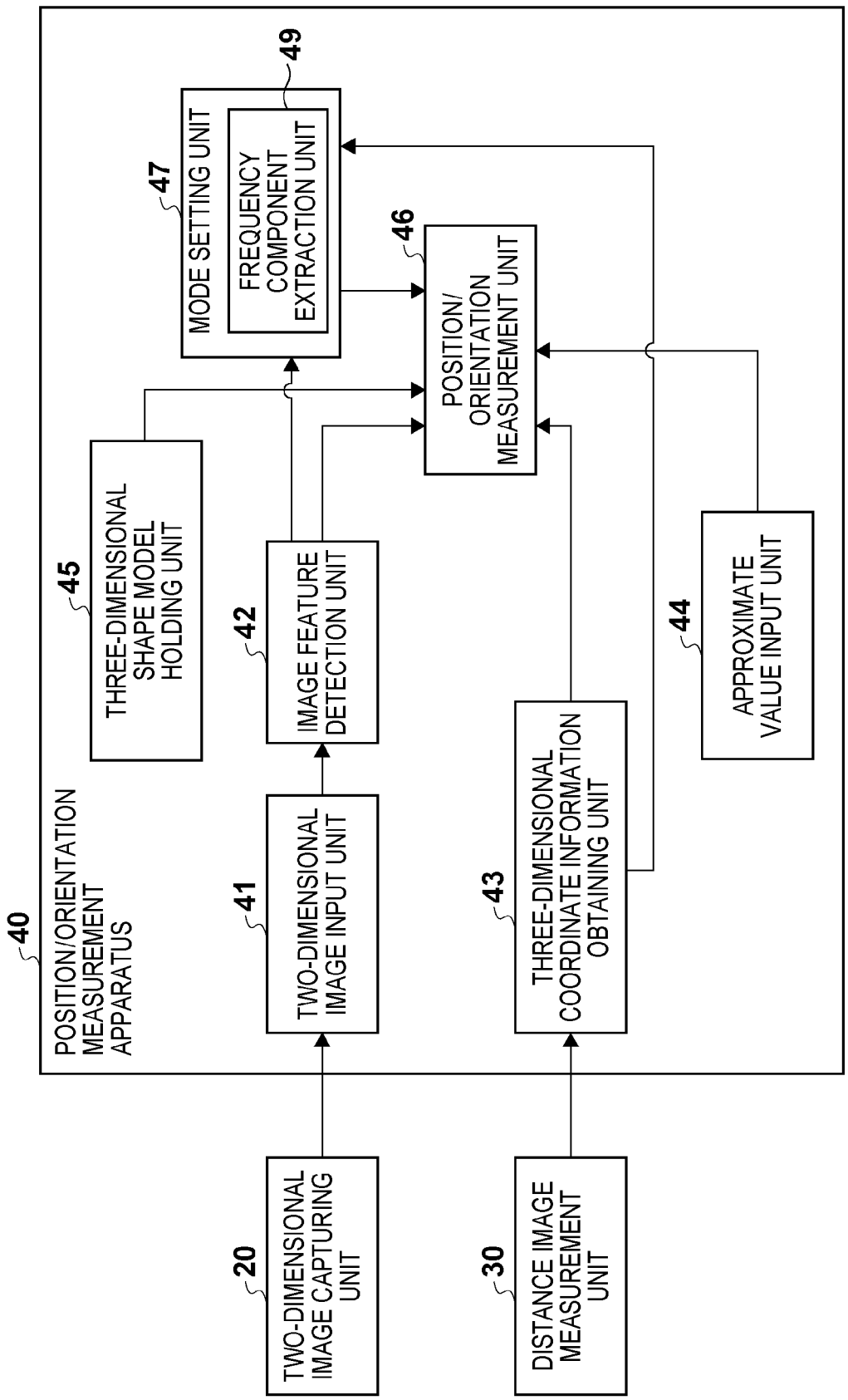
FIG. 11 is a block diagram showing an example of the functional arrangement of a position/orientation measurement apparatus 40 according to the third embodiment.

An example of the functional arrangement of a position/orientation measurement apparatus 40 according to the third embodiment will be described with reference to FIG. 11. Note that the parts denoted by the same reference numerals as in FIG. 1 described in the first embodiment basically have the same functions as in the first embodiment. Points different from the first embodiment will mainly be described here.

A point different from the first embodiment is mode setting processing by a mode setting unit 47. More specifically, the mode setting unit 47 sets the mode based on image features representing the measurement object which are detected from the two-dimensional image by an image feature detection unit 42.

The mode setting unit 47 includes a frequency component extraction unit 49 configured to extract a frequency component from the two-dimensional image. If the frequency component extracted from the two-dimensional image by the frequency component extraction unit 49 is lower than a predetermined frequency, the mode setting unit 47 determines that the number of image features on the two-dimensional image is small, and sets the third measurement mode. Otherwise, the first measurement mode is set.

In the third measurement mode, a position/orientation measurement unit 46 fits the three-dimensional shape model to a three-dimensional point cloud obtained by a three-dimensional coordinate information obtaining unit 43. Position/orientation calculation processing is thus executed to measure (calculate) the position/orientation of the measurement object.

The procedure of processing in the third measurement mode will be described. In the third measurement mode, the position/orientation of the object is calculated by solving expression (7) described in the first embodiment. In the third measurement mode, the image features of the two-dimensional image are not used to measure the position/orientation of the object. Hence, a two-dimensional image shift calculation unit 461 shown in FIG. 3 does not perform processing. A scale conversion unit 463 does not perform distance shift scale conversion, either.

Note that the processing in the position/orientation measurement apparatus 40 according to the third embodiment is performed in accordance with the same procedure as in FIG. 4 described in the first embodiment, and a description using the drawing will be omitted here. Different points are the difference in the process of step S104, omission of the process of step S105, and the difference in the process of step S106. More specifically, in the process of step S104, the image feature detection unit 42 detects image features representing the measurement object from the two-dimensional image. The frequency component extraction unit 49 extracts a frequency component of the two-dimensional image. In the process of step S106, the mode setting unit 47 sets the mode based on the frequency component extracted by the frequency component extraction unit 49.

In the third measurement mode, object position/orientation measurement processing is performed in accordance with the same procedure as that in the first measurement mode described with reference to FIG. 6, and a description using the drawing will be omitted here. Different points are, for example, the absence of edge association in the process of step S202 and the absence of scale conversion in the process of step S203.

As described above, according to the third embodiment, the measurement mode is set based on the detection state (number) of image features on a two-dimensional image. For example, if the surface of the measurement object rarely has a pattern (texture) or edges, measurement using the two-dimensional image is determined to be difficult, and the third measurement mode is set. Otherwise, the first measurement mode is set.

Note that in the above-described third embodiment, mode setting is determined based on the frequency component on the two-dimensional image. However, the present invention is not limited to this. Only determining whether the number of image features is large or small on the two-dimensional image suffices. For this reason, the mode may be set based on not the frequency component but the number of edges or image features.

In the above-described third embodiment, mode setting is determined based on the image features on the two-dimensional image. However, the present invention is not limited to this. For example, the mode may be set based on the distance image measured by a distance image measurement unit 30. In this case, the mode setting unit 47 determines based on the distance image of the measurement object whether it includes a lot of three-dimensional curves. Upon determining that there are a lot of three-dimensional curves, edges are few in number, and measurement using the two-dimensional image is difficult. Hence, the third measurement mode is set. Otherwise, the first measurement mode is set.

The representative embodiments of the present invention have been described above. However, the present invention is not limited to the above-described and illustrated embodiments, and changes and modifications can appropriately be made without departing from the scope of the present invention. For example, the above-described first to third embodiments may be combined. That is, the state of the measurement object and the like may be measured using the methods described in the first to third embodiments. Then, measurement may be performed by setting one of the first to third measurement modes based on the result.

Several modifications of the above-described embodiments will be explained.

(First Modification)

A three-dimensional shape model may be arranged in the three-dimensional space based on the position/orientation of the measurement object measured in the past (for example, immediately before) or the approximate value of the measurement object, and the mode may be changed based on the observation result of the three-dimensional shape model. Upon determining based on the observation result that, for example, the apparent area observed from the camera is small, the object is rough when viewed from the camera, or thin objects pile, the distance image is unreliable. In this case, the second measurement mode is set.

(Second Modification)

Measurement using the two-dimensional image is difficult in initial position/orientation in which a region rarely having a pattern (texture) in the measurement object occupies a large part of the screen observed from the camera, or many three-dimensional curves are observed at edge portions. In such a case, the third measurement mode may be set.

(Third Modification)

Each of the above-described modes need not always be set exclusively. Instead, the mode may be switched continuously in accordance with the object measurement state. In this case, the mode is continuously switched by manipulating the scaling coefficients of expression (7) described in the first embodiment.

(Fourth Modification)

The mode may selectively be set based on a user instruction input via a user interface (input/output means). The user interface is implemented by, for example, a GUI menu or a hardware switch.

(Fifth Modification)

Instead of automatically setting the mode on the system side (position/orientation measurement apparatus 40), the user may be allowed to decide final mode setting. That is, in the position/orientation measurement apparatus 40, the above-described processing is executed to present (display) recommended modes (candidate modes to be set) on the display screen or the like. In this case, the user selects and sets a mode via the user interface (input/output means).

(Sixth Modification)

The current mode of the system (position/orientation measurement apparatus 40) may be presented to the user. The presentation may be done either by display on the display screen or by using hardware such as a lamp or an LED.

(Seventh Modification)

Figure 12:
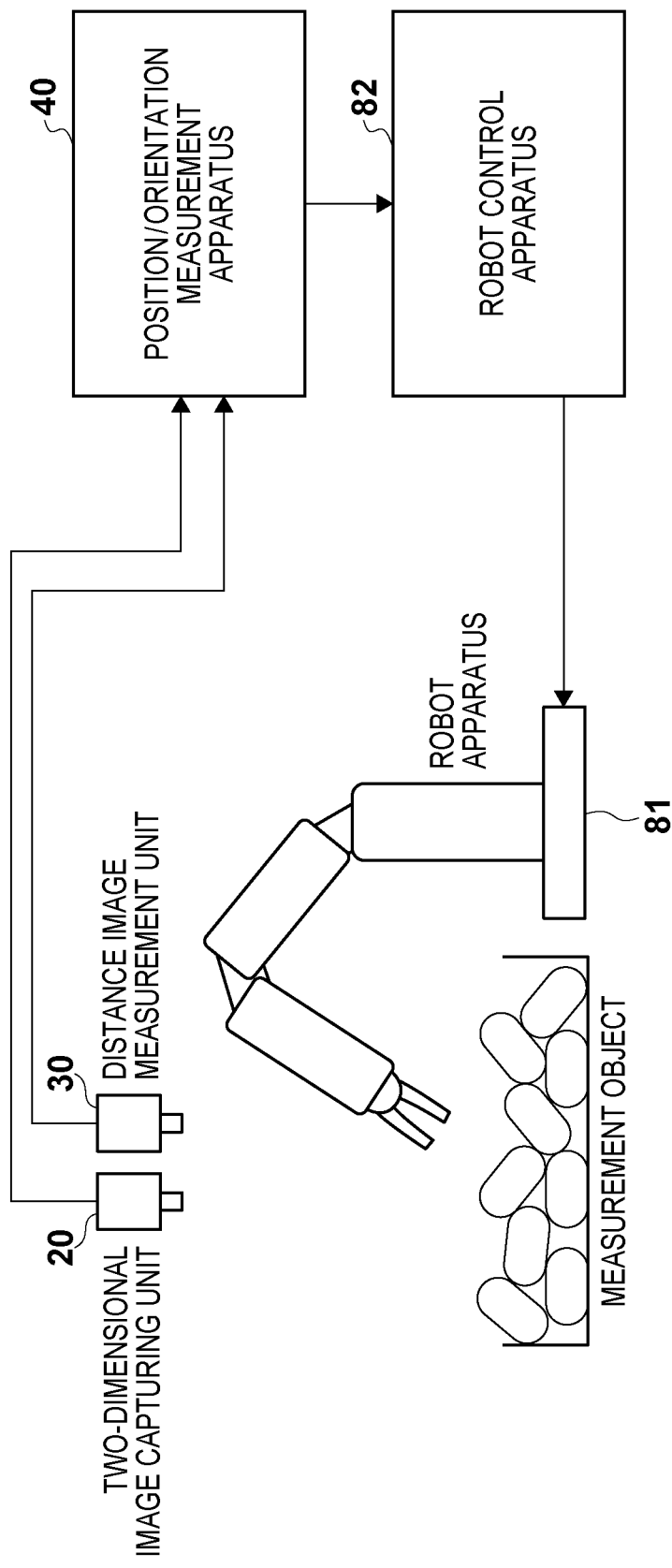
FIG. 12 is a block diagram showing an example of the arrangement of a control system that controls a robot system.

The above-described position/orientation measurement apparatus 40 is also applicable to, for example, a robot system that grips or sucks a measurement object. FIG. 12 illustrates the arrangement of a control system that controls a robot system based on the position/orientation of a measurement object.

As in the above-described embodiments, the position/orientation measurement apparatus 40 inputs a two-dimensional image captured by the two-dimensional image capturing unit 20 and a distance image measured by the distance image measurement unit 30 to the apparatus. The position/orientation measurement apparatus 40 measures the position/orientation of the measurement object and outputs the information (position/orientation information) of the position/orientation of the measurement object to a robot control apparatus 82. Based on the position/orientation information, the robot control apparatus 82 outputs control information to a robot apparatus 81 to instruct gripping or sucking the measurement object. The robot apparatus 81 thus grips or sucks the measurement object based on the control information.

Note that the present invention can take a form of, for example, a system, an apparatus, a method, a program, or a storage medium. More specifically, the present invention is applicable to a system including a plurality of devices, or an apparatus including a single device.

As described above, according to the present invention, it is possible to selectively execute one of a plurality of measurement methods concerning measurement of the position/orientation of a measurement object.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162209 filed on Jul. 16, 2010, which is hereby incorporated by reference herein in its entirety.

The invention claimed is:

1. An apparatus comprising:
a processor; and
a memory storing a program including instructions executed by the processor,
wherein the processor and the memory are operatively coupled to function as units comprising:
(1) a first input unit configured to input a two-dimensional image of a measurement object captured by an image capturing apparatus;
(2) an obtaining unit configured to obtain distance data of the measurement object measured by a distance sensor;
(3) a second input unit configured to input a user's instruction;
(4) a mode selecting unit configured to select a usage mode based on the user's instruction from (a) a first mode, in which a measurement is performed using the two-dimensional image and the distance data, and (b) a second mode, in which a measurement is performed using only one of the two-dimensional image and the distance data; and
(5) a measurement unit configured to measure a position and orientation of the measurement object in accordance with the usage mode selected by the mode selecting unit.

2. The apparatus according to claim 1, wherein the user's instruction is input according to an user's input to a GUI menu which is provided to a user.

3. The apparatus according to claim 1, wherein the distance data represents three-dimensional coordinates on a surface of the measurement object.

4. The apparatus according to claim 1, wherein the distance sensor includes a projector which projects a slit beam and a camera which captures the projected slit beam.

5. The apparatus according to claim 1, wherein the distance sensor includes cameras which are arranged at different positions.

6. The apparatus according to claim 1, wherein the distance sensor is a sensor which employs a time-of-flight method.

7. An apparatus comprising:
a processor; and
a memory storing a program including instructions executed by the processor,
wherein the processor and the memory are operatively coupled to function as units comprising:
(1) an input unit configured to input a two-dimensional image of a measurement object captured by an image capturing apparatus;
(2) an obtaining unit configured to obtain distance data of the measurement object measured by a distance sensor;
(3) a mode selecting unit configured to select a usage mode from a first mode, in which a measurement is performed using the two-dimensional image and the distance data, and a second mode, in which a measurement is performed using only one of the two-dimensional image and the distance data;
(4) a measurement unit configured to measure a position and orientation of the measurement object in accordance with the usage mode selected by the mode selecting unit; and
(5) a holding unit configured to hold information representing a three-dimensional shape model of the measurement object,
wherein the first mode is a mode in which the measurement is performed by (a) associating an image feature detected from the two-dimensional image with a feature of the three-dimensional shape model and (b) associating the distance data with the feature of the three-dimensional shape model, wherein the second mode is a mode in which the measurement is performed by associating the image feature detected from the two-dimensional image with the feature of the three-dimensional shape model in a case of using the two-dimensional image, and wherein the measurement is performed by associating the distance data with the feature of the three-dimensional shape model in a case of using the distance data.

8. The apparatus according to claim 7, wherein the processor and the memory further function as:
an approximate position and orientation input unit configured to input an approximate position and orientation of the measurement object,
wherein the associating the detected image feature with the feature of the three-dimensional shape model and the associating the distance data with the feature of the three-dimensional shape model is performed on the basis of the approximate position and orientation.

9. The apparatus according to claim 7, wherein the feature of the three-dimensional shape model represents a line representing a shape of the measurement object or a point on a surface of the measurement object.

10. The apparatus according to claim 7, wherein the processor and the memory further function as:
a detection unit configured to detect the image feature of the measurement object from the two-dimensional image.

11. The apparatus according to claim 10, wherein the image feature is each of edges representing extreme values of a gradient of pixel values of pixels included in the two-dimensional image.

12. A method for an apparatus, the method comprising:
inputting a two-dimensional image of a measurement object captured by an image capturing apparatus;
obtaining distance data of the measurement object measured by a distance sensor;
inputting a user's instruction;
selecting a usage mode based on the user's instruction from (a) a first mode, in which a measurement is performed using the two-dimensional image and the distance data, and (b) a second mode, in which a measurement is performed using only one of the two-dimensional image and the distance data; and
measuring a position and orientation of the measurement object in accordance with the selected usage mode.

13. A non-transitory computer-readable storage medium storing a computer program for causing a computer to function as units comprising:
a first input unit configured to input a two-dimensional image of a measurement object captured by an image capturing apparatus;
an obtaining unit configured to obtain distance data of the measurement object measured by a distance sensor;
a second input unit configured to input a user's instruction;
a mode selecting unit configured to select a usage mode based on the user's instruction from (a) a first mode, in which a measurement is performed using the two-dimensional image and the distance data, and (b) a second mode, in which a measurement is performed using only one of the two-dimensional image and the distance data; and a measurement unit configured to measure a position and orientation of the measurement object in accordance with the usage mode selected by the mode selecting unit.

14. A method for an apparatus, the method comprising:
inputting a two-dimensional image of a measurement object captured by an image capturing apparatus;
obtaining distance data of the measurement object measured by a distance sensor;
selecting a usage mode from (a) a first mode, in which a measurement is performed using the two-dimensional image and the distance data, and (b) a second mode, in which a measurement is performed using only one of the two-dimensional image and the distance data;
measuring a position and orientation of the measurement object in accordance with the selected usage mode; and
holding information representing a three-dimensional shape model of the measurement object,
wherein the first mode is a mode in which the measurement is performed by (a) associating an image feature detected from the two-dimensional image with a feature of the three-dimensional shape model and (b) associating the distance data with the feature of the three-dimensional shape model,
wherein the second mode is a mode in which the measurement is performed by associating the image feature detected from the two-dimensional image with the feature of the three-dimensional shape model in a case of using the two-dimensional image, and
wherein the measurement is performed by associating the distance data with the feature of the three-dimensional shape model in a case of using the distance data.

15. A non-transitory computer-readable storage medium storing a computer program for causing a computer to function as units comprising:
an input unit configured to input a two-dimensional image of a measurement object captured by an image capturing apparatus;
an obtaining unit configured to obtain distance data of the measurement object measured by a distance sensor;
a mode selecting unit configured to select a usage mode from (a) a first mode, in which a measurement is performed using the two-dimensional image and the distance data, and (b) a second mode, in which a measurement is performed using only one of the two-dimensional image and the distance data;
a measurement unit configured to measure a position and orientation of the measurement object in accordance with the usage mode selected by the mode selecting unit; and
a holding unit configured to hold information representing a three-dimensional shape model of the measurement object,
wherein the first mode is a mode in which the measurement is performed by (a) associating an image feature detected from the two-dimensional image with a feature of the three-dimensional shape model and (b) associating the distance data with the feature of the three-dimensional shape model,
wherein the second mode is a mode in which the measurement is performed by associating the image feature detected from the two-dimensional image with the feature of the three-dimensional shape model in a case of using the two-dimensional image, and wherein the measurement is performed by associating the distance data with the feature of the three-dimensional shape model in a case of using the distance data.

* * * * *